United States Patent [19]

McGalliard

[11] 4,295,793

[45] Oct. 20, 1981

[54] FLUID SENSITIVE SWITCHING CONTROLLER

[76] Inventor: James D. McGalliard, 11171 Fenwick Pl., Santa Ana, Calif. 92705

[21] Appl. No.: 958,143

[22] Filed: Nov. 6, 1978

[51] Int. Cl.³ ............................................. F04B 49/06
[52] U.S. Cl. ...................................... 417/36; 137/392
[58] Field of Search .......................... 417/36; 137/392; 340/620

[56] References Cited

U.S. PATENT DOCUMENTS

| | | | |
|---|---|---|---|
| 3,091,252 | 5/1963 | Jones | 137/392 |
| 3,131,335 | 4/1964 | Berglund | 137/392 |
| 3,339,578 | 9/1967 | Smith | 137/392 |
| 3,498,131 | 3/1970 | Rickey | 340/620 |
| 3,667,022 | 5/1972 | Quinn | 417/36 |
| 3,800,205 | 3/1974 | Zalar | 417/36 |
| 3,894,240 | 7/1975 | Rose | 340/620 |
| 4,065,277 | 12/1977 | Rose | 137/342 |
| 4,082,666 | 4/1978 | Aradio | 340/620 |

*Primary Examiner*—William L. Freeh
*Attorney, Agent, or Firm*—Knobbe, Martens, Olson, Hubbard & Bear

[57] ABSTRACT

An electronic controller maintains the level of fluid in a container between an upper level and a lower level defined by the location of two probes in the container. Each probe actuates a first light source-photosensor pair used for controlling a device capable of changing the fluid level in the container. In some embodiments of this invention, a second photosensor-light source pair latches the first pair to provide system hysteresis. In other embodiments, the same pair both controls the fluid level device and latches itself to provide system hysteresis.

2 Claims, 7 Drawing Figures

4,295,793

FLUID SENSITIVE SWITCHING CONTROLLER

BACKGROUND OF THE INVENTION

There have been numerous devices invented for controlling the level of fluid in containers and among these are several electronic devices exemplified in U.S. Pat. Nos. 3,757,317 (Kahn et al), 3,978,352 (Rose), and 3,787,733 (Peters). In the prior art, electronic devices for controlling the level of fluid in a container or tank between two predetermined levels utilized electronically active devices such as transistors involving a fair amount of expense in parts and production. In the prior art, exemplified by the above-mentioned patents, electronic circuits usually serve the function of a latch control device which caused the mechanism controlling the fluid level in the tank to operate when the fluid exceeded a predetermined level.

One method was found in the prior art which eliminated the apparent necessity of three transistors to form a latching mechanism. This method is exemplified in U.S. Pat. No. 3,894,240 (Rose), which discloses a latching circuit making use of the voltage differential between the ignition voltage and the conductance voltage of a neon bulb. In the device, exemplified by the Rose '240 patent, the neon bulb is connected across a power source through two probes and a voltage dividing circuit. The voltage divider must be precisely adjusted such that the voltage difference between the two probes is equal to the voltage difference between the ignition voltage and conductance voltage of the neon bulb. These two probes define an upper level and a lower level in a fluid container. The lamp is ignited whenever fluid reaches the level of the upper level probe and remains ignited until fluid drops below the level of the lower level probe. Because of the fact that both the ignition voltage and the conductance voltage of such a neon bulb change with the aging of the bulb and with changes in temperature, and also vary among different neon bulbs, the adjustment of the voltage divider circuit is critical in order to maintain the voltage differential. Thus, in such a device, it would be expected that frequent adjustments of the voltage divider circuit would be necessary to account for the age of the bulb, temperature changes, changes in the resistance of the fluid, and any necessary change in neon bulbs. Devices for controlling fluid level using a neon bulb and photosensor, which depend upon the voltage differential between the ignition and conductance of a neon bulb, have an inherent source of unreliability due to the necessity of adjusting the voltage divider circuit of the device.

Thus, the prior art never completely solved the problem of finding a simple, reliable control circuit for controlling fluid level between two points in a tank.

SUMMARY OF THE INVENTION

In this invention, a device controlling the fluid level in a container which receives fluid from an external source, all dependence upon adjustable devices, such as a voltage divider, or changeable parameters, such as conductance or ignition voltage of a gas discharge tube, and dependence upon power consuming active devices, such as transistors is eliminated. In several embodiments of this invention, a pair of light paths is provided by either a light source with two photosensors, or a photosensor with two light sources. As described below, these two systems are interchangeable and may be considered as two photosensor-light source pairs, providing two light paths. A first sensor-source pair, controlled by an upper level fluid probe in the container, is turned on when fluid contacts the upper level probe, and activates the second sensor-source pair, causing the second pair to be latched on through a lower level fluid probe in the container. The second sensor-source pair completes a circuit between a pump or other fluid level controlling device and a power source, and the pump will begin to pump fluid out of the container at a rate greater than the rate at which fluid flows into the container. As the fluid level drops below the upper level probe, the upper level probe can no longer activate the first pair. However, the second sensor-source pair remains latched on through the lower level fluid probe; and therefore the pump will continue to operate. The second sensor-source pair will continue to be latched on until the fluid level falls below the lower level probe. When this occurs, the second sensor-source pair is deactivated, and the pump will cease to operate. The fluid level in the container will then begin to rise.

Again, the fluid level will contact the lower level probe as it begins to rise. However, the system remains off, since the second sensor-source pair will latch on only after the first sensor-source pair is activated. When the fluid level finally reaches the level of the upper level probe, the first sensor-source pair is activated through the upper level probe. This again causes the second sensor-source pair to be latched on through the lower level probe, thus turning on the pump. Because the pump acts to withdraw fluid from the container, the fluid level will again start to fall, and the entire cycle will repeat itself.

In other embodiments of this invention, only one light source-photosensor pair is required to maintain fluid level between an upper level probe and a lower level probe in a container. The light source activates the photosensor whenever fluid contacts the upper level probe. When the photosensor is so activated, it provides a current path through the lower level probe to the light source and to a pump which withdraws fluid from the container. As fluid rises in the container above the level of the lower level probe, the light source remains off, since the photosensor is initially non-conductive and prevents current flowing through the lower level probe. The light source is activated as soon as fluid contacts the upper level probe, illuminating the photosensor. The photosensor then allows current to flow through the lower level probe to the pump, activating the pump. The pump lowers the level of fluid below the upper level probe. The light source, photosensor and pump all remain activated by current flowing through the lower level probe, until the level of fluid finally falls below the level of the lower level probe, due to the continued action of the pump. After fluid has fallen below the lower level probe, current can no longer flow through this probe, and the entire circuit is deactivated. The system returns to its initial state, and the cycle may repeat itself.

This invention operates substantially independently of temperature, of the threshold conduction voltage of any photosensor, of the intensity of the light source, and of the impedances presented by any photosensor or light source. Also, it is unnecessary to employ the use of variable resistors, or voltage dividers (or any adjustable component) in order for the control circuit of this invention to function. Therefore, it is apparent that the difficulties encountered in the prior art having to do with variations or drift in critical parameters upon which the operation of the controller depended, such as variations in the conductance or ignition voltage of a neon bulb, have been completely eliminated.

It should be recognized that this invention is not limited to a fluid level control device in which the pump drains fluid from the container, but also includes similar control devices in which fluid must be pumped into the fluid container in order to maintain the desired fluid level in the container, due to draining of fluid from the container.

DESCRIPTION OF THE PREFERRED EMBODIMENT

Figure 1:
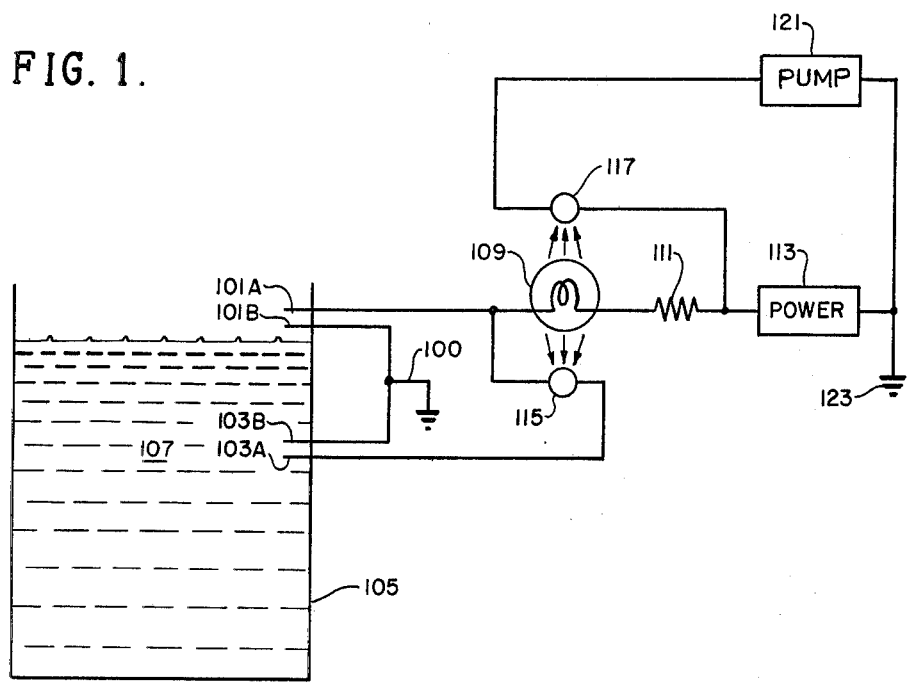
FIG. 1 is a schematic diagram of an embodiment of the control circuit of this invention having one light bulb and two photosensors.

FIG. 1 shows a fluid tank 105 containing a substantially conductive fluid 107, such as water. In this embodiment, fluid flows into the tank 105 at a variable rate and a pump 121 is provided which can pump the fluid out of the tank at a rate exceeding the rate into which fluid flows into the tank. It should be recognized that any electrically actuated means for controlling fluid flow may be used instead of the pump 121. Such a means would be, for example, a valve, which may be electrically actuated. Furthermore, the means for controlling fluid flow may be an electrically actuated alarm, in response to which a valve, pump, or similar device may be actuated or deactuated manually or automatically. Furthermore, such an alarm may cause actuation of any device whether or not it is related to controlling fluid level. For example, a device for changing the temperature may be actuated. Alternatively, the alarm may be actuated without actuating any other device. The tank 105 has an upper probe consisting of two closely spaced electrodes, 101A and 101B, and a lower probe, consisting of two closely spaced electrodes, 103A and 103B. Electrodes 101B and 103B are each connected to ground 100. Whenever the fluid 107 contacts both electrodes 101A and 101B of the upper probe, a closed path is provided for current from the ground 100 through the fluid between the electrodes 101A and 101B, and through a light bulb 109, and a current limiting resistor 111. The current is supplied to this series circuit by a power source 113, which is referenced to ground 123.

An alternative path for current supplied by the power source 113 to pass through the light bulb 109 to ground 100 is provided through a photosensor 115 and the lower level probe consisting of the electrodes 103A and 103B. The photosensor 115 is preferably sufficiently close to the light bulb 109 as to be rendered conductive whenever the light bulb 109 shines. Also, the photosensor 115 is rendered nonconductive whenever the light bulb 109 does not shine.

A second photosensor 117 is provided sufficiently close to the light bulb 109 as to be rendered conductive whenever the light bulb 109 shines. The photosensor 117 is also rendered nonconductive whenever the light bulb 109 does not shine. The photosensor 117, in the embodiment illustrated in FIG. 1, is connected in series between the power source 113 and a pump 121. Thus, whenever the photosensor 117 is rendered conductive, it closes the circuit between the power source 113 and the pump 121. Whenever the light bulb 109 does not shine, the photosensor 117 is rendered nonconductive and thereby acts to open the circuit between the power source 113 and the pump 121. The pump 121, when activated, pumps fluid 107 out of the container 105, thereby causing the level of the fluid 107 to decrease in a direction away from the electrode 101A and toward the electrode 103A.

When fluid 107 contacts the probes 101A and 101B, the light bulb 109 shines because a circuit is completed from the power source 113 to the light bulb 109 and to the ground points 100 and 123. When the light 109 thus shines, the two photosensors 115 and 117 are rendered conductive. The photosensor 115 immediately provides an alternative path for current to pass from the power source through the light bulb and to ground 100. This path is through the lower level probe consisting of the electrodes 103A and 103B. Also, the shining of the light bulb 109 turns on the photosensor 117, thereby closing the circuit between the power source 113 and the pump 121. This activates the pump 121 and the pump then begins pumping fluid 107 out of the container 105, causing the level of the fluid 107 to drop in a direction away from the electrode 101A and toward the electrode 103A.

After fluid has dropped below the level of the electrode 101A, the current can no longer flow between the electrodes 101A and 101B, and thus the direct path provided by the electrodes 101A and 101B for the current through the light bulb 109 to ground 100 is no longer available. Thus, the current from the power source 113 through the light bulb 109 must pass through the alternative path consisting of the photosensor 115 and the electrodes 103A and 103B to ground 100. The light bulb 109, having been initially turned on when the fluid contacted the upper level electrodes 101A and 101B, continues to render the photosensor 115 conductive such that the path to ground 100 provided by the photosensor 115 and the electrodes 103A and 103B continues to allow current to flow through the light bulb 109 from the power source 113.

Because the current still flows through the light bulb 109 from the power source 113 even after fluid has fallen below the level of the upper level electrode 101A, the light bulb 109 continues to shine, thereby maintaining the photosensor 117 in the conductive state. Again, the photosensor 117, while the light bulb 109 shines, maintains the circuit between the power source 113 and the pump 121 closed, thereby assuring continued operation of the pump, lowering the level of the fluid 107 in the container 105.

Continued operation of the pump 121 causes the level of the fluid 107 to eventually fall below the level of the electrode 103B. At this point current can no longer flow between the electrodes 103A and 103B, thereby terminating the flow of current through the photosensor 115 to ground 100. Since the path provided by the photosensor 115, the electrode 103A, and the electrode 103B, to ground 100 was the only remaining path available for current passing through the light bulb 109, the circuit through the light 109 and the power source 113 is opened, and current therefore no longer flows through the light bulb 109. The light bulb 109 thus ceases to shine, and the photosensors 115 and 117 are rendered nonconductive. When the photosensor 117 is thus rendered nonconductive, it opens the circuit between the power source 113 and the pump 121, since the photosensor 117 is connected in series between the power source 113 and the pump 121. Current can therefore no longer flow from the power source 113 through the pump 121, and therefore the pump ceases to operate. The level of the fluid 107 in the container 105 therefore ceases to fall, and either remains at the level between the electrodes 103A and 103B, or begins to rise. Thus, the fluid level is maintained between the levels in the container 105 defined by the level of the electrode 101A and the level of the electrode 103A. As the fluid level rises again in the container, it will contact the electrodes 103A and 103B. However, the pump will remain off. The fluid will therefore continue to rise until the fluid level reaches the level of the probes 101A and 101B. At this point, the light is activated and the pump is activated, and the cycle repeats itself as described before.

The photosensors 115 and 117 are preferably photosensitive diodes or photodiodes. The light bulb 109 may be of any ordinary type. Because the photodiodes 115 and 117 operate over a wide range of light intensity, the circuit illustrated in FIG. 1 will operate independently of the type of light bulb used. The circuit also operates independently of any variations in the parameters of the circuit elements, including the conductivity of the photodiodes 115 and 117 and the resistivity of the resistor 111 and the conductivity of fluid 107. It is apparent that no variable resistors are necessary and that no adjustments are necessary to any of the components of the circuit of FIG. 1 in order for the control device of FIG. 1 to work.

Figure 2:
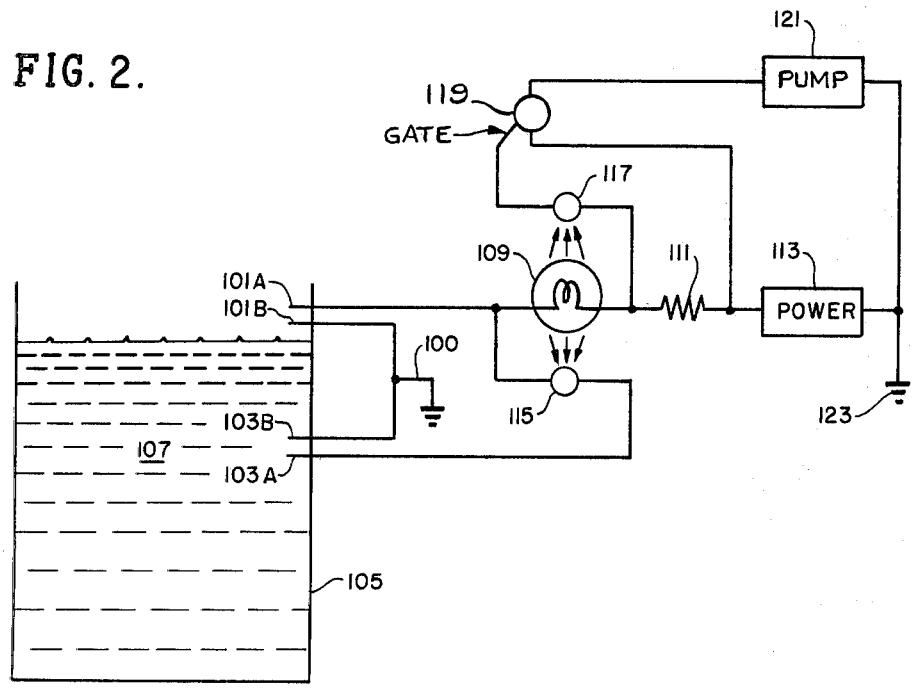
FIG. 2 is a schematic diagram of an alternative embodiment of the control circuit of this invention similar to FIG. 1, using, in addition, an active switching device.

FIG. 2 illustrates an alternative embodiment of the control circuit of FIG. 1. In the embodiment illustrated in FIG. 2, when it is desired that a pump having power requirements in excess of the capacity of the photosensor 117 be used, an active switching device, such as an SCR (Silicon Controlled Rectifier) or a relay may be used as indicated at 119 to transfer power under high current conditions from the power source 113 through the pump 121. If the control circuit is to be used with an alternating current source, the switch 119 is preferably a triac. The switch 119 can conduct a large current in response to a signal of lower power from the photosensor 117. The remainder of the circuit of FIG. 2 operates in the same manner as the operation of the circuit illustrated in FIG. 1 described above. However, the photosensor 117, instead of conducting current directly to the pump 121, conducts current to the gate of the switch 119. The switch 119 controls the pump.

Figure 3:
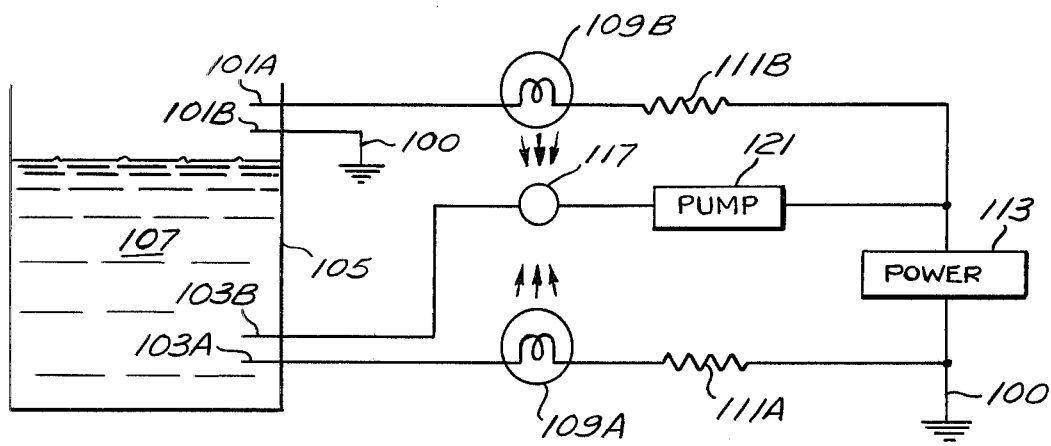
FIG. 3 is a schematic diagram of an alternative embodiment of the control circuit of this invention having two light bulbs and one photosensor.

FIG. 3 shows a schematic diagram of another embodiment of this invention. An upper level probe comprising two electrodes, 101A and 101B, has one of its electrodes 101B connected to ground 100 and the other of its electrodes 101A connected to one side of a light source 109B. The other side of the light source 109B is connected in series with one side of a power source 113 through a current limiting resistor 111B. The other side of the power source is connected to ground 100. A fluid tank contains fluid 107, the level of which is shown to be above the lower level probe comprising the electrodes 103A and 103B. The electrode 103B connects to one side of a photosensor 117. The other side of the photosensor 117 is connected to one side of the fluid pump 121. The other side of the fluid pump 121 is connected to the ungrounded side of the power source 113. The electrode 103A of the lower level probe is connected to one side of a light source 109A. The other side of the light source 109A is connected to ground 100 through a current limiting resistor 111A.

It is assumed that as long as the pump does not operate, the level of fluid 107 in the container will rise. As fluid rises to contact the level of the lower level probe, the control circuit, illustrated in FIG. 3, remains off. Even though the fluid may contact the two probes 103A and 103B, no power will flow from the power source 113 through the pump 121 because the photosensor 117 remains non-conductive in the absence of illumination from either light source 109A or 109B. The light source 109A does not light because it is connected to the power source 113 through the photosensor 117, which remains nonconductive. The light source 109B will not light because fluid has not yet contacted the level of the upper level probe. Therefore, the pump 121 remains off and fluid will continue to rise past the level of the lower level probe.

When fluid finally contacts the electrodes 101A and 101B of the upper level probe, the upper level probe will complete a circuit from the power source 113 to the light source 109B. Current will flow from the power source 113 through the current limiting resistor 111B, through the light source 109B, between the electrodes 101A and 101B of the upper level probe and return through ground 100 to the grounded side of the power supply 113. Thus, the light source 109B will begin to illuminate when fluid rises to the level of the upper level probe. Light from the light source 109B illuminates the photosensor 117, thereby rendering the photosensor 117 conductive. This will allow current to flow through the series circuit comprising the photosensor 117, the pump 121, the power source 113, the current limiting resistor 111A, the light source 109A, the electrode 103A, and the electrode 103B. Thus, the pump 121 will receive power from the power source 113, and the pump will begin to operate. Continued operation of the pump results in a lowering of the level of the fluid 107 in the container. Thus, fluid will fall below the level of the upper level probe, and electrodes 101A and 101B will no longer complete a circuit from the power source 113 to the light source 109B. Therefore, as the fluid level begins to fall, the light source 109B will cease to illuminate the photosensor 117. The photosensor 117, however, remains conductive because it continues to be illuminated by the light source 109A. Therefore, the pump 121 continues to operate as fluid falls below the level of the upper level probe electrodes 101A and 101B. The pump 121 will continue to operate as long as the level of the fluid 107 remains above the level of the electrodes 103A, 103B of the lower level probe.

Continued operation of the pump 121 will eventually cause the level of the fluid 107 to fall below the level of the electrode 103B. When this occurs, current will no longer flow between the lower level probe electrodes 103A and 103B. Thus, current will no longer flow through the photosensor 117, the light source 109A, and the pump 121. When fluid falls below the level of the lower level probe, the pump 121 is turned off, the light source 109A is turned off, and the photosensor 117 is rendered non-conductive. The fluid level may again rise in the container 105 until it reaches the level of the upper level electrodes 101A, B, and the cycle will repeat itself, because the system has returned to its original state.

Figure 4:
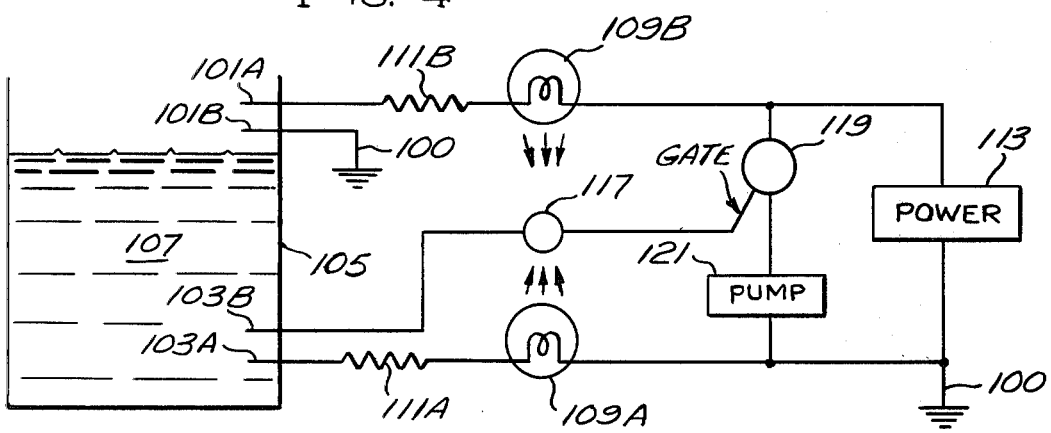
FIG. 4 is a schematic diagram of the preferred embodiment of the control circuit of this invention having two light bulbs, one photosensor and an active switching device.

FIG. 4 illustrates the preferred embodiment of the control circuit having one photosensor and two light sources, and a switching device 119. FIG. 4 shows a fluid container having an upper level probe and a lower level probe. An electrode 101A of the upper level probe is connected to one side of a light source 109B through a current limiting resistor 111B. The other side of the light source 109B is connected to the ungrounded side of a power supply 113. The other electrode 101B of the upper level probe is connected to ground. FIG. 4 also shows a lower level probe having one of its electrodes 103A connected to one side of a light source 109A through a current limiting resistor 111A. The other side of the light source 109A is connected to ground 100. The other electrode 103B of the lower level probe is connected to one side of a photosensor 117. The other side of the photosensor 117 is connected to the gate of a switching device 119. The switching device 119 completes a circuit between the power source 113 and the load 121. In one particular embodiment of this invention, the switching device is a triac, connected between the ungrounded side of the power supply 113 and one side of the pump 121. Use of a triac enables the control circuit of FIG. 4 to operate properly when the power source 113 is an alternating current power source. The other side of the pump 121 is connected to ground 100. The advantage of this embodiment of the invention is that large currents required to operate the pump 121 need not pass through either the high level probe, the low level probe, either of the light sources, nor through the photosensor. Instead, the photosensor 117 need conduct only a small amount of current in order to control the gate of the switching device 119. Furthermore, the light sources 109A and 109B and the upper and lower level probes need conduct only enough current to illuminate the light sources 109A and 109B.

Operation of the control circuit of FIG. 4 begins with the control circuit being inactive, the switching device 119 being non-conductive, and the photosensor 117 being non-conductive, and the light sources 109A and 109B being off. Fluid 107 is introduced into the fluid container and its level slowly begins to rise. The fluid level passes above the electrodes 103A and 103B, and, although 103A and 103B are shorted together by the fluid 107, no current passes through the light source 109A because the photosensor 117 remains non-conductive. Therefore, at this point in the operation, no current can pass from the power source 113 through the photosensor 117 to the light source 109A. Thus, the photosensor 117 remains non-conductive as fluid rises above the level of the lower level probe toward the level of the upper level probe comprising the electrodes 101A and 101B, and the pump 121 remains off until fluid reaches the level of the upper level probe.

As fluid continues to rise, it finally contacts the electrodes 101A and 101B of the upper level probe. This immediately completes the circuit between the power source 113 and the light source 109B. Current then flows through the light source 109B through the current limiting resistor 111B and through the electrodes 101A and 101B to ground 100. The light source 109B then illuminates the photosensor 117. This renders the photosensor 117 conductive which permits current to pass from the power source 113 through the light source 109A, the lower level probe, and the photosensor 117 to the gate of the switching device 119. This current switches the switching device 119 on, thus allowing current to flow from the power source 113 through the fluid pump 121, turning the pump on.

The pump 121 decreases the level of the fluid 107 in the container. The fluid then falls below the level of the electrodes 101A and 101B. The current then no longer flows through the light source 109B because no path is provided between the electrodes 101A and 101B following the absence of fluid from the upper level probe. However, the photosensor 117 remains conductive because it continues to be illuminated by light from the light source 109A due to current conducted through the photosensor itself to the light source 109A. Thus, the photosensor continues to supply a small current to the gate of the switching device 119, thereby maintaining the switching device 119 in its conductive state. Therefore, the fluid pump 121 remains on until the fluid level had fallen below the level of the lower level probe.

After fluid 107 has fallen below the level of the electrodes 103A and 103B of the lower level probe, current no longer flows through the photosensor 117 and the gate of the switching device 119, since the electrodes 103A and 103B no longer provide a current path. The solid state switching device 119 becomes non-conductive, thereby opening the circuit between the power source 113 and the fluid pump 121. Thus, after fluid has fallen below the level of the lower level probe, the fluid pump becomes inactive. At this point, the control circuit of FIG. 4 returns to its original state, and the cycle repeats itself.

Figure 5:
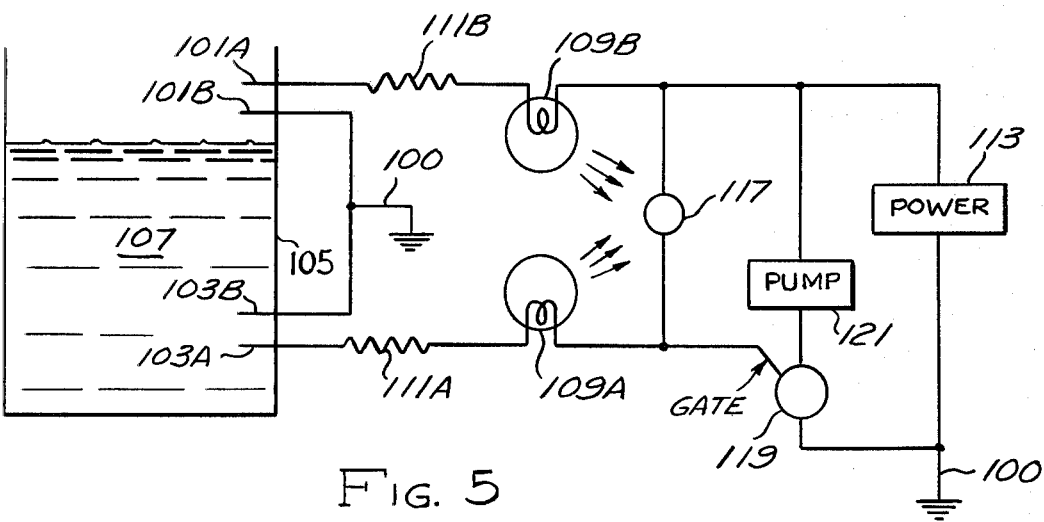
FIG. 5 is a schematic diagram of an alternative embodiment of the control circuit of this invention also having two light bulbs, one photosensor and an active switching device.

FIG. 5 shows another embodiment of the invention having two light sources and one photosensor. The control circuit of FIG. 5 has two light sources, 109A and 109B, connected through current limiting resistors 111A and 111B, respectively, to a lower level probe 103A and an upper level probe 101A, respectively. These probes are connected to ground at their electrodes 103B and 101B, respectively. The light sources 109A and 109B illuminate a photosensor 117 which connects one side of the power source 113 to the gate of a switching device 119. The switching device 119 completes a circuit between the power source 113 and a fluid pump 121. This embodiment of the invention also has the advantage that the high current levels required to run the pump 121 do not flow through either the upper or lower level probes, nor through the light sources 109A and 109B, nor through the photosensor 117. Instead, only a low level current is required through the photosensor 117 to control the gate of the switching device 119. Furthermore, the current limiting resistors 111A and 111B restrict the amount of current flowing through the light sources 109A and 109B.

Operation of the control circuit of FIG. 5 begins with the control circuit being inactive, the switching device 119 being non-conductive, and the photosensor 117 being non-conductive, and the light sources 109A and 109B being off. Fluid 107 is introduced into the fluid container, and its level slowly begins to rise. The fluid level passes above the electrodes 103A and 103B, and, although 103A and 103B are shorted together by the fluid 107, no current passes through the light source 109A because the photosensor 117 remains non-conductive. Therefore, at this point in the operation, substantially no current can pass from the power source 113 through the photosensor 117 to the light source 109A. There may, however, be some small leakage current through the gate of the switching device 119 to the light bulb 109A. However, if, for example the power source 113 is a direct current source, and the switching device 119 is a transistor having a high input impedance, such current through the bulb 109A will be insufficient to illuminate the bulb 109A. Thus, the photosensor 117 remains non-conductive as fluid rises above the level of the lower level probe toward the level of the upper level probe comprising the electrodes 101A and 101B. Therefore, the pump 121 remains off until fluid reaches the level of the upper level probe.

As fluid continues to rise, it finally contacts the electrodes 101A and 101B of the upper level probe. This immediately completes the circuit between the power source 113 and the light source 109B. Current then flows through the light source 109B through the current limiting resistor 111B and through the electrodes 101A and 101B to ground 100. The light source 109B then illuminates the photosensor 117. This renders the photosensor 117 conductive which permits current to pass from the power source 113 through the photosensor 117 and through the light source 109A. The photosensor 117 also supplies a current to the gate of the switching device 119. This gate current switches the solid state switching device 119 on, and this allows current to flow from the power source 113 through the fluid pump 121. The pump is then turned on.

The pump 121 then acts to decrease the level of the fluid 107 in the container, causing the fluid to fall below the level of the electrodes 101A and 101B. The current then no longer flows through the light source 109B because no path is provided between the electrodes 101A and 101B following the absence of fluid from the upper level probe. However, the photosensor 117 remains conductive because it continues to be illuminated by the light from the light source 109A due to current conducted through the photosensor itself to the light source 109A. Thus, the photosensor continues to supply a current to the gate of switching device 119, which continues to complete the circuit between the power source 113 and the fluid pump 121. Therefore, the fluid pump 121 remains on until the fluid level had fallen below the level of the lower level probe.

After fluid 107 has fallen below the level of the electrodes 103A and 103B of the lower level probe, the current no longer flows through the light source 109A to ground 100, since the electrodes 103A and 103B no longer provide a path for the current to ground 100. Therefore, the photosensor no longer is illuminated by either light source 109A and 109B, and therefore becomes non-conductive. Thus, the photosensor 117 no longer provides a current to the gate of the switching device 119. The switching device 119 thereafter becomes non-conductive, thereby opening the circuit between the power source 113 and the fluid pump 121. Thus, after fluid has fallen below the level of the lower level probe, the fluid pump becomes inactive. At this point, the control circuit of FIG. 5 returns to its original state and the cycle repeats itself.

Figure 6:
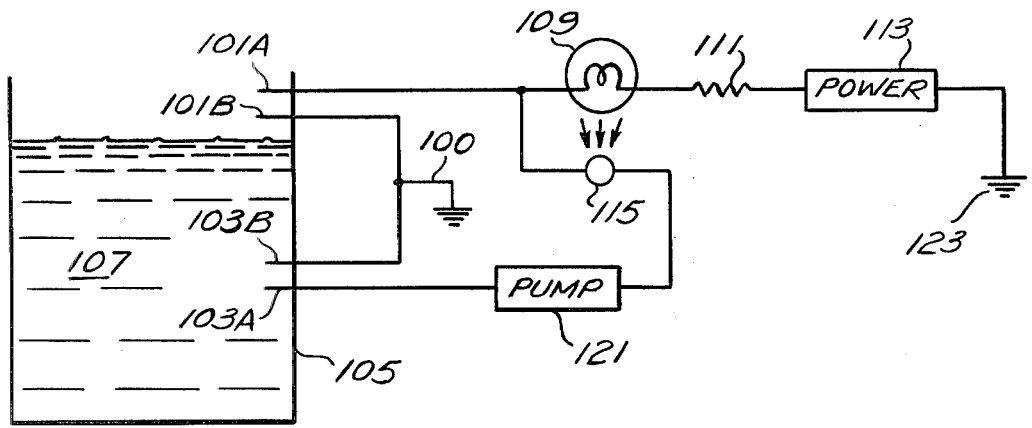
FIG. 6 is a schematic diagram of an alternative embodiment of the control circuit of this invention having only one light bulb and one photosensor.
Figure 7:
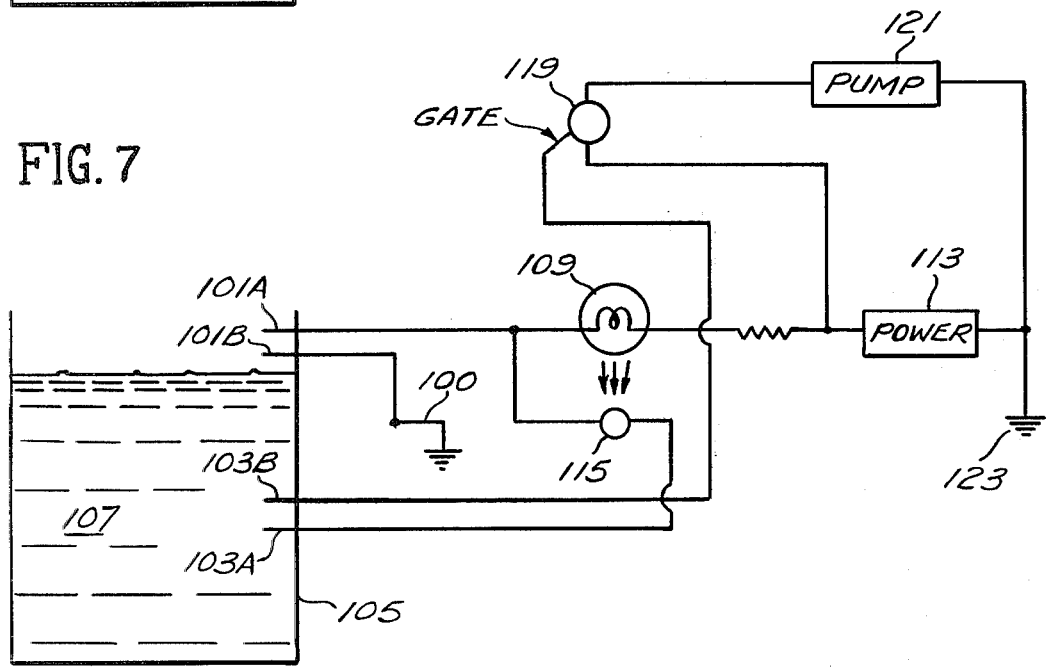
FIG. 7 is a schematic diagram of an alternative embodiment of the control circuit of this invention similar to FIG. 6, using, in addition, an active switching device.

FIGS. 6, 7 and 8 illustrate alternative embodiments of this invention in which only one light bulb and only one photosensor are used in the control circuit. The embodiment illustrated in FIG. 6 is the same as the embodiment illustrated in FIG. 1 except that the photosensor 117 is eliminated and the pump 121 is relocated in FIG. 6 so as to be connected in series between the photosensor 115 and the electrode 103A. The operation of the control circuit remains the same. Thus, in FIG. 6 as fluid rises above the level of the electrodes 103A and 103B, the light bulb 109 remains off. The light bulb 109 is turned on when fluid reaches the level of the electrodes 101A and 101B, thereby rendering the photosensor 115 conductive and allowing current to flow to the pump 121. As fluid falls below the level of the electrodes 101A and 101B, due to the action of pump 121, current will still be provided to the pump 121, the light bulb 109 and the photosensor 115 through the lower level electrodes 103A and 103B. Thus, the light bulb 109 will remain latched on, the photosensor 115 will remain on and the pump 121 will remain on as long as the fluid level remains above the level of the lower level electrodes 103A, 103B. After fluid has fallen below the level of the lower level electrodes 103A, 103B due to the continued action of pump 121, current will no longer flow between the probes 103A, 103B and therefore the current flowing through the light bulb 109, the photosensor 115 and the pump 121 will cease to flow, thereby turning all these components off.

The alternative embodiment of this invention illustrated in FIG. 7 is the same as the embodiment illustrated in FIG. 2 except that the photosensor 117 is eliminated and a connection is provided directly between the gate of the switch 119 and the electrode 103B and the electrode 103B is no longer connected to ground 100. The switch 119 is preferably a triac. The gate of the switch 119 however no longer is directly connected to the light bulb 109 or resistor 111. In the control circuit of FIG. 7, as fluid 107 rises in the container 105, the pump 121 will remain off until the fluid contacts the upper level electrodes 101A and 101B. When the upper level electrodes 101A and 101B are contacted by the fluid 107, a path is provided for current to flow from the power source through the light bulb 109 to ground 100. This causes the light 109 to shine, thereby rendering photosensor 115 conductive. As soon as the photosensor 115 is rendered conductive, a current is supplied to the gate of the switch 119, which turns the switch 119 on, thereby completing a circuit between the pump 121 and the power source 113. After the fluid 107 has fallen below the level of the upper level electrodes 101A, 101B, due to the action of pump 121, the pump 121 will remain on because current continues to be provided to the gate of the switch 119 through the lower level electrodes 103A, 103B. After fluid 107 falls below the level of the lower level electrodes 103A, 103B, the light bulb 109 is turned off because current will no longer flow between the electrodes 103A, 103B. Therefore, no voltage will be supplied to the gate of the switch 119, thereby rendering the switch 119 non-conductive, which causes the pump 121 to be turned off.

The control circuits illustrated in FIGS. 6 and 7 are not turned on when fluid rises to contact the lower level electrodes 103A, 103B. This is because the photosensor 115 in each of these circuits is initially non-conductive and remains non-conductive after fluid has contacted the electrodes 103A, 103B since the light source 109 remains off, thereby preventing any current from flowing through the electrodes 103A, 103B. The photosensor 115 is placed in series between the light bulb 109 and the lower level electrodes 103A, 103B. Thus, the photosensor 115 always acts as a latching means which maintains the control circuit in its on state as long as fluid is above the level of the lower level probe, but which is incapable by itself of turning the control circuit on.

Thus, it is seen that this invention provides a control circuit utilizing two inexpensive devices to control a switch and a pump controlling fluid level in a container. No power is consumed during quiescent periods by the circuit of this invention. The circuit of this invention utilizes components, including a photosensor and a lightbulb, which operate effectively and durably and without requiring adjustments.

What is claimed is:

1. A device for controlling the level of fluid in a container comprising:
   a first fluid probe;
   a second fluid probe;
   a unitary light source;
   a unitary light sensor illuminated by said unitary light source;
   means for initiating illumination of said unitary light source when one of said probes contacts said fluid, regardless of the conductive state of said unitary light sensor;
   means responsive to said unitary light sensor for maintaining illumination of said unitary light source whenever said sensor is illuminated and the other of said probes contacts said fluid; and
   means for controlling the level of fluid in said container, said means being connected in series with said sensor.

2. A device for controlling the level of fluid in a container comprising:
   a first fluid probe;
   a second fluid probe;
   a unitary light source;
   a unitary light sensor;
   said unitary light source illuminating only said unitary light sensor without illuminating any other light sensor, said unitary light sensor responsive only to said unitary light source;
   means for initiating illumination of said unitary light source whenever said first fluid probe contacts said fluid;
   means responsive to said unitary light sensor for maintaining illumination of said unitary light source so long as said second fluid probe contacts said fluid; and
   means responsive to illumination from said unitary light source for controlling the level of fluid in said container.

* * * * *